United States Patent [19]

Yabumoto

[11] Patent Number: 4,710,816
[45] Date of Patent: Dec. 1, 1987

[54] PICTURE SIGNAL GENERATING APPARATUS

[75] Inventor: Seiichi Yabumoto, Tokyo, Japan
[73] Assignee: Nippon Kogaku K. K., Tokyo, Japan
[21] Appl. No.: 911,356
[22] Filed: Sep. 25, 1986

[30] Foreign Application Priority Data

Sep. 30, 1985 [JP] Japan ............................... 60-216781
Sep. 30, 1985 [JP] Japan ............................... 60-216782

[51] Int. Cl.⁴ ............................................. H04N 3/14
[52] U.S. Cl. .......................... 358/213.15; 358/213.19; 358/213.28; 358/213.26
[58] Field of Search ..................... 358/213.11, 213.15, 358/213.18, 213.19, 213.23, 213.26, 213.28, 213.29

[56] References Cited

U.S. PATENT DOCUMENTS

| | | | |
|---|---|---|---|
| 4,317,134 | 2/1982 | Woo | 358/213.23 |
| 4,432,017 | 2/1984 | Stoffel | 358/213.26 |
| 4,438,457 | 3/1984 | Tandon | 358/213.26 |
| 4,547,676 | 10/1985 | Suzuki | 358/213.19 |
| 4,563,708 | 1/1986 | Ishibashi | 358/213.19 |

Primary Examiner—Michael A. Masinick
Attorney, Agent, or Firm—Shapiro and Shapiro

[57] ABSTRACT

A picture signal generating apparatus has a CCD line sensor. In this apparatus, an image read instruction pulse is generated whenever a CCD line sensor or an original image is moved by a predetermined distance, an exposure is detected by a time integral determined by a pulse interval of the image read instruction pulses upon detection of an intensity of light reflected by or transmitted through the original image, and an image output from the CCD line sensor in response to the image read instruction pulse is normalized according to the detected exposure. Image output normalization can be achieved by dividing the CCD line sensor image output by the exposure or by controlling the intensity of the illumination light so as to keep the exposure constant.

10 Claims, 9 Drawing Figures

PICTURE SIGNAL GENERATING APPARATUS

BACKGROUND OF THE INVENTION

1. Field of the Invention

The present invention relates to a picture signal generating apparatus having a linear image sensor.

2. Related Background Art

In order to generate a picture signal upon reading of a two-dimensional image in a conventional system, a linear image sensor (e.g., a CCD line sensor) having a plurality of photoelectric transducer elements aligned in line along one direction is moved in a direction perpendicular to an arrangement direction of the transducer elements to read out an image. For this purpose, the intensity of light transmitted through or reflected by an original is kept constant to obtain a normalized picture signal having an accurate signal level corresponding to the density of the original image.

If the speed of the CCD line sensor is irregular, a picture signal representing an image distortion in a direction corresponding to the moving direction of the CCD line sensor is generated. More specifically, if the speed is reduced, the image is prolonged. However, if the speed is increased, the image is shortened.

In order to eliminate the image distortion along the scanning direction, a displacement of the CCD line sensor must be spontaneously detected. For example, an image read instruction pulse may be generated whenever the CCD line sensor is fed by a displacement corresponding to one pixel.

However, if the image read instruction pulse is generated for every predetermined displacement of the CCD line sensor so as to eliminate the image distortion caused by irregular speeds along the scanning direction, the image distortion can be eliminated. However, an interval of the image read instruction pulses is not kept constant. The exposure for determining the level of the picture signal varies according to the pulse interval. The picture signal from the CCD line sensor cannot be normalized by constant control of the intensity of illumination light. As a result, the signal levels vary according to changes in exposure caused by irregular scanning speeds.

SUMMARY OF THE INVENTION

It is an object of the present invention to provide a picture signal generating apparatus having a CCD line sensor and capable of generating an accurate picture signal.

In order to achieve the above object of the present invention, there is provided a picture signal generating apparatus wherein an image read instruction pulse is generated whenever a CCD line sensor or an original image is moved by a predetermined distance, an exposure is detected by a time integral determined by a pulse interval of the image read instruction pulses upon detection of an intensity of light reflected by or transmitted through the original image, and an image output from the CCD line sensor in response to the image read instruction pulse is normalized according to the detected exposure. Image output normalization can be achieved by dividing the CCD line sensor image output by the exposure or by controlling the intensity of the illumination light so as to keep the exposure constant.

BRIEF DESCRIPTION OF THE DRAWINGS

FIGS. 6(a) to 6(f) and FIGS. 7(a) to 7(f) are timing charts for explaining part of the embodiment of the present invention;

DETAILED DESCRIPTION OF THE PREFERRED EMBODIMENT

Figure 1:
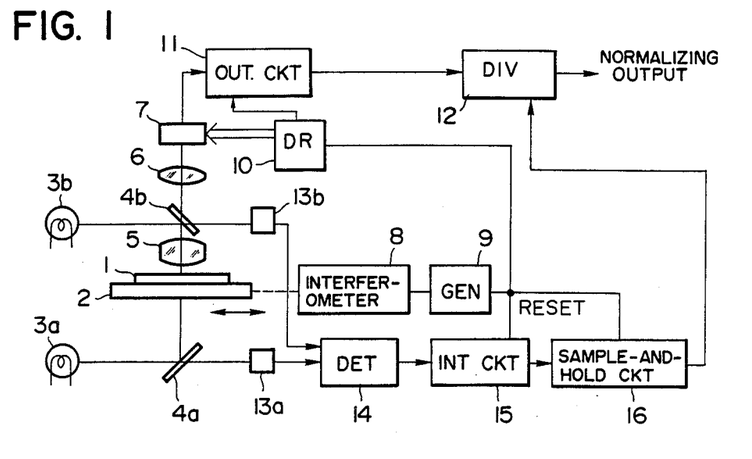
FIG. 1 is a schematic view showing a picture signal generating apparatus according to an embodiment of the present invention.

An original 1 obtained by forming a light-reflecting portion such as a thin metal film on a transparent substrate such as a glass substrate is placed on a mechanical stage 2 and is moved on an X-Y plane. The original 1 on the mechanical stage 2 is illuminated with light from a transmission optical system consisting of an illumination lamp 3a and a half mirror 4a or a reflection optical system consisting of an illumination lamp 3b and a half mirror 4b. An image of the light reflected by or transmitted through the original 1 is focused on a CCD line sensor 7 through an objective lens 5 and a relay lens 6. If the transmission optical system consisting of the lamp 3a and the mirror 4a is used, an opening is formed on the mechanical stage 2, and the image sensor detects light transmitted through the original 1. Illumination light may be a light component excluding visible light if the light component has a wavelength allowing detection of the image sensor.

The movement of the original 1 placed on the mechanical state 2 is measured by an interferometer 8. A detection signal from the interferometer 8 is supplied to a read instruction pulse generator 9. The generator 9 generates an image read instruction pulse whenever the original is moved by a distance corresponding to, e.g., one pixel in a direction perpendicular to the electrical scanning direction of the CCD line sensor 7.

An output from the read instruction pulse generator 9 is supplied to a driver 10. The picture signal having a level proportional to the charge of the photoelectric transducer elements of the CCD line sensor 7 is transmitted to an output circuit 11. In this case, charging is performed during the exposure time determined by the pulse interval of the image read instruction pulses. The output circuit 11 processes and outputs the picture signal.

Photodiodes 13a and 13b are respectively arranged in the transmission and reflection optical systems to detect the intensity of light from the illumination system. Outputs from the photodiode 13a and 13b are supplied to a detector 14. The detector 14 detects one of the outputs from the photodiodes 13a and 13b and supplies a voltage signal proportional to the light intensity to an integrator 15. The integrator 15 also receives as a reset signal an image read instruction pulse generated by the read instruction pulse generator 9. The integrator 15 integrates the voltage signal proportional to the intensity signal from the detector 14 to obtain an exposure. The integral operation is reset for every image read instruction pulse. An output from the integrator 15 is supplied to a sample-and-hold circuit 16. The sample-and-hold circuit 16 samples and holds an integral output immediately prior to resetting of the integral operation of the integrator 15 upon reception of the image read instruction signal from the read instruction pulse generator 15. The photodiodes 13a and 13b, the detector 14, the integrator 15, and the sample-and-hold circuit 16 integrate the intensity of light from the illumination system for a period of time determined by the pulse interval of the image read instruction pulses, thereby detecting the exposure.

A picture signal of the output circuit 11 which is obtained by sampling and holding the output from the CCD line sensor 7 output in response to the image read pulse, and an output from the sample-and-hold circuit 16 which is obtained by sampling and holding the output (of the integrator 15) representing the output measured at the same time when the charge of the picture signal is detected are supplied to a division circuit 12. The picture signal from the output circuit 11 is divided by the signal which represents the exposure and which is output from the sample-and-hold circuit 16, thereby obtaining a normalized output of the picture signal.

Figures 2, 3:
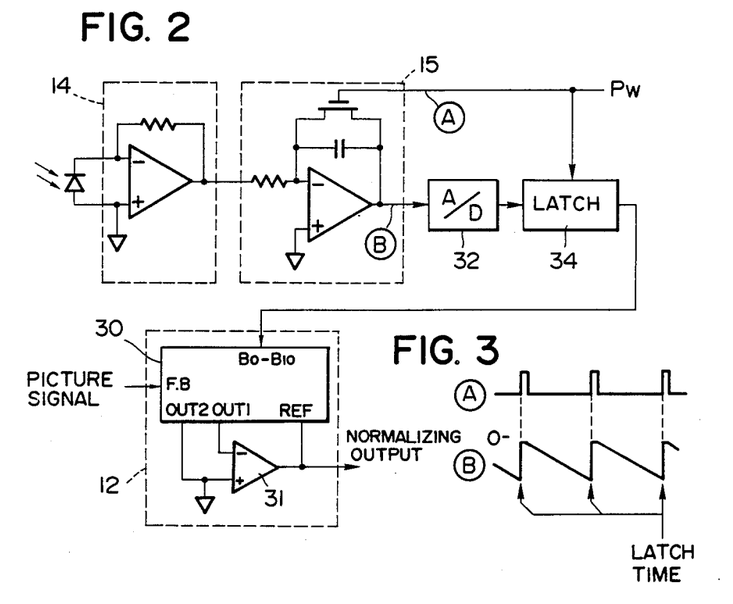
FIG. 2 is a block diagram showing part of the apparatus in FIG. 1.
FIG. 3 is a timing chart for explaining the operation of the apparatus in FIG. 1.

FIG. 2 shows part of the circuit in FIG. 14. The voltage signal representing the intensity of the illumination system and output from the detector 14 is supplied to the integrator 15. The integrator is reset whenever the image read instruction pulse PW is obtained. The exposure voltage signal obtained by integration of the integrator 15 is converted into a 10-bit digital signal by an A/D converter 32 and is latched by a latch 34 for latching the data at a timing immediately prior to resetting of the integrator 15. The latched signal is output as a divisor to the division circuit 12. The A/D converter 32 and the latch 34 constitute the sample-and-hold circuit 16 in FIG. 1.

The division circuit 12 is constituted by a known multiplying D/A converter 30 and an operational amplifier 31. 10-bit exposure data latched by the latch 34 is input to the divisor input terminals B0 to B10. The picture signal read out from the CCD line sensor 7 and sampled and held by the output circuit 11 is input to a terminal FB of the division circuit 12. The operational amplifier 31 outputs the normalized picture signal obtained by dividing the picture signal by the exposure as the digital data.

As shown in B of FIG. 3, the image read instruction pulse is supplied to the CCD line sensor 7 whenever the original 1 is moved by a distance corresponding to one pixel. The latch 34 latches the exposure data from the A/D converter 32 at the leading edge of the image read instruction pulse PW. As shown in B FIG. 3, the integrator 15 is reset in response to the leading edge of the pulse PW. The integrator 15 starts integration at the trailing edge of the image read instruction pulse PW. Referring to FIG. 1, light from the light sources 3a and 3b is reflected by the mirrors 4a and 4b and is guided onto the original 1. However, light transmitted through the mirrors 4a and 4b may be guided onto the original 1, and light reflected by the mirrors 4a and 4b may be guided onto the photodiodes 13a and 13b.

Figure 4:
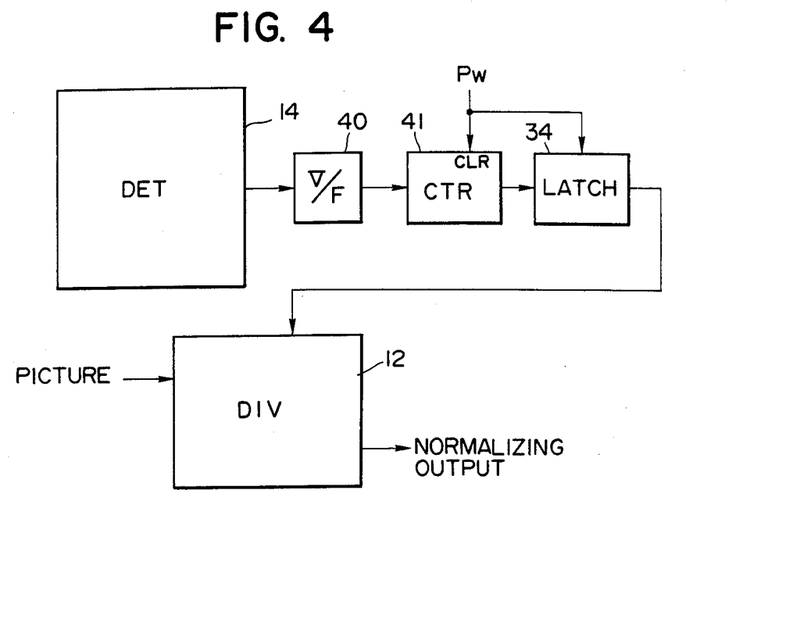
FIG. 4 is a block diagram showing a picture signal generating apparatus obtained by partially improving the apparatus of FIG. 1.

The same reference numerals as in FIG. 2 denote the same parts in FIG. 4. A circuit in FIG. 4 is characterized by a circuit consisting of a voltage/frequency (V/F) converter 40, a counter 41, and a latch 34 to supply a divisor input (exposure data) to a multiplying D/A converter 30.

The V/F converter 40 receiving the voltage signal which is output from the detector 14 and which represents the intensity of light from the illumination system supplies a clock signal having a frequency proportional to the voltage signal to the counter 41. The image read instruction pulse PW is supplied as a reset signal to the clear terminal of the counter 41. The counter 41 counts the clock pulses having a frequency proportional to the intensity of light and generated from the V/F converter, thereby digitally integrating the intensity of the light from the illumination system and hence obtaining exposure data. The exposure data counted by the counter 41 is latched by the latch 34 which receives the image read instruction pulse PW immediately prior to counter resetting in the same manner as in FIG. 2. The latched data is supplied as divisor data to the multiplying D/A converter 30 in the division circuit 12. The picture signal is divided by the exposure data by the operational amplifier 31 to obtain the normalized picture signal.

The V/F converter 40 and the counter 41 correspond to the integrator 15 in FIG. 1. The latch circuit 34 corresponds to the sample-and-hold circuit 16 in FIG. 1.

The operation of the embodiment shown in FIG. 1 will be described hereinafter.

When the CCD line sensor 7 starts reading the original 1, the original 1 is continuously fed in a direction perpendicular to the electrical scanning direction of the CCD line sensor 7 by means of a drive mechanism (not shown) of the mechanical stage 2. The displacement of the original 1 by the mechanical state 2 is measured by the interferometer 8. When the original 1 is fed by a distance corresponding to one pixel of the CCD line sensor 7, the read instruction pulse generator 9 supplies the image read instruction pulse to the CCD driver 10. In this case, the signal representing the charges of the photoelectric transducer elements of the CCD sensor 7 is extracted by the output circuit 11. The extracted signal is processed by processing such as sample and holding or the like. The processed signal is output to the division circuit 12. The intensity level of the transmission or reflection illumination system is detected by the photodiode 13a or 13b, and the detected level is supplied to the detector 14. The voltage signal proportional to the intensity of light is supplied from the detector 14 to the integrator 15. The integrator 15 integrates the voltage signal from the detector 14 from the period between current resetting and the next resetting of the image read pulse, thereby detecting the exposure at the CCD line sensor 7. An output from the integrator 15 is sampled and held by the sample-and-hold circuit 16 which receives the read instruction pulse at a timing immediately prior to integrator resetting. The output from the sample-and-hold circuit 16 is supplied as a divisor to the division circuit 12. The picture signal from the output circuit 11 is divided by the signal which represents the exposure and which represents the exposure, thereby outputting the normalized picture signal.

If variations in speed of the mechanical stage 2 occur in movement of the original 1, the image read instruction pulse is generated when the displacement of the mechanical stage which is measured by the interferometer 8 reaches a predetermined displacement even if the variations in speed occur. Therefore, a suitable interval of the read instruction pulses corresponding to the irregular speed can be obtained. Even if the variations in speed occur, the image along the moving direction of the original 1 is not distorted.

Since the interval of the read instruction pulse is not kept unchanged since variations in speed occur, variations in exposure of the CCD line sensor 7 occur. However, the picture signal from the output circuit 11 is divided by the output from the sample-and-hold circuit 16 which is derived from the detection output obtained by measuring the changing exposure (caused by irregular speeds). Therefore, the normalized output does not include the signal level variations caused by changes in exposure. As a result, the picture signal having the proper signal level corresponding to the density of the original 1 can be obtained.

In an arrangement (FIG. 5) obtained by partially modifying the apparatus of FIG. 1, instead of the division circuit 12 of the embodiment of FIG. 1, there are provided a comparator 17 for receiving an exposure detection signal from the sample-and-hold circuit 16 and a driver 18 for controlling the intensity of the illumination system on the basis of the comparison output from the comparator 17. An output from the driver 18 is supplied to power circuits 19a and 19b for the illumination lamps 3a and 3b, variable neutral density filters (to be referred to as variable ND filters hereinafter) 20a and 20b, or diaphragms 21a and 21b, thereby variably controlling the intensities of the illumination systems. Other circuit arrangements are the same as those of the embodiment of FIG. 1, except for the division circuit 12, and the same reference numerals as in FIG. 1 denote the same parts in FIG. 5, and a detailed description thereof will be omitted.

The operation of the modification in FIG. 5 will be described below. The exposure signal output from the sample-and-hold circuit 16 is compared by the comparator 17 with a reference voltage Vr for giving a predetermined exposure. If the speed is reduced to prolong the interval between the read instruction pulses and then increase the exposure level, the comparator 17 supplies a low level output to the driver 18. The driver 18 causes the power circuits 19a and 19b to decrease the intensities of the illumination lamps 3a and 3b, causes the variable ND filter 20 to reduce the intensities of the illumination lamps, or causes the diaphragms 21a and 21b to be stopped down to reduce the intensities thereof. Therefore, the intensities of the illumination sources are controlled to the levels determined by the reference voltage Vr for determining the predetermined intensity.

However, if the speed of the original 1 is increased to shorten the interval between the read instruction pulses, the exposure level is reduced. The comparator 17 supplies an H level output to the driver 18 to cause the power circuits 19a and 19b, the variable ND filters 20a and 20b, or the diaphragms 21a and 21b to increase the intensities of the illumination lamps so as to control the measured exposure levels to be the values predetermined by the reference voltage.

Under the illumination system intensity control, the intensity of the illumination system can be kept constant even if variations in interval between the read instruction pulses for determining the exposure time occur. The exposure level received by the photoelectric transducer elements of the CCD line sensor 7 is kept constant. As a result, the normalized picture signal free from the variations in intensity level caused by variations in speed can be obtained.

Figure 5:
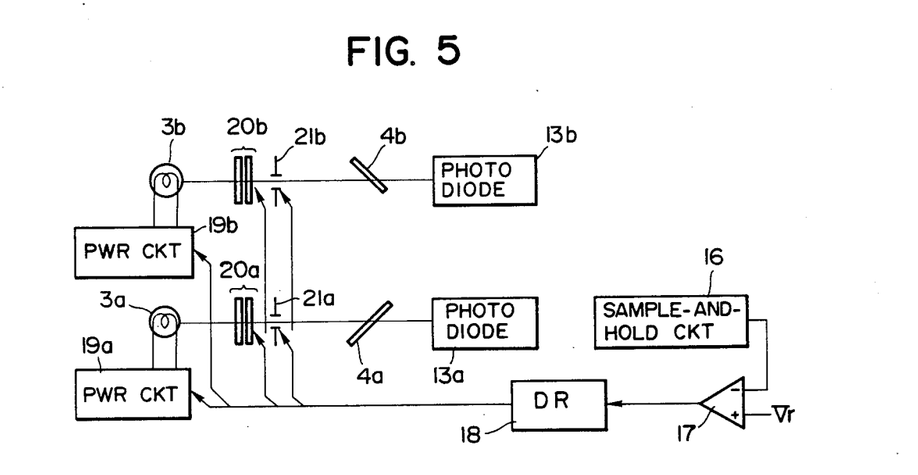
FIG. 5 is a block diagram showing a picture signal generating apparatus obtained by partially modifying the apparatus of FIG. 1.

The arrangement in FIG. 5 has a large time delay from a detection timing of variations in exposure to a timing at which the intensity of the illumination system is controlled is relatively large. Therefore, slow changes in exposure can be effectively corrected.

In the modification of FIG. 5, the variable ND filters for the power circuits or the diaphragms are used to control the intensities of the illumination systems to obtain the predetermined exposure. However, the present invention is not limited to this means, but may be extended to adapt a proper means to control the intensities of the illumination systems.

A detailed arrangement of the output circuit 11 will be described below.

In a conventional CCD line sensor, picture signals are output in units of odd- or even-numbered pixels because of the structural reason of the sensor chip. The odd- and even-numbered pixel picture signals are output as parallel outputs. In this case, these outputs are alternately generated in a time-divisional manner.

In the CCD line sensor for outputting the parallel odd- and even-numbered pixel signals, a signal processor as an external circuit is required to obtain a composite signal of the even- and odd-numbered pixel signals.

Figure 6:
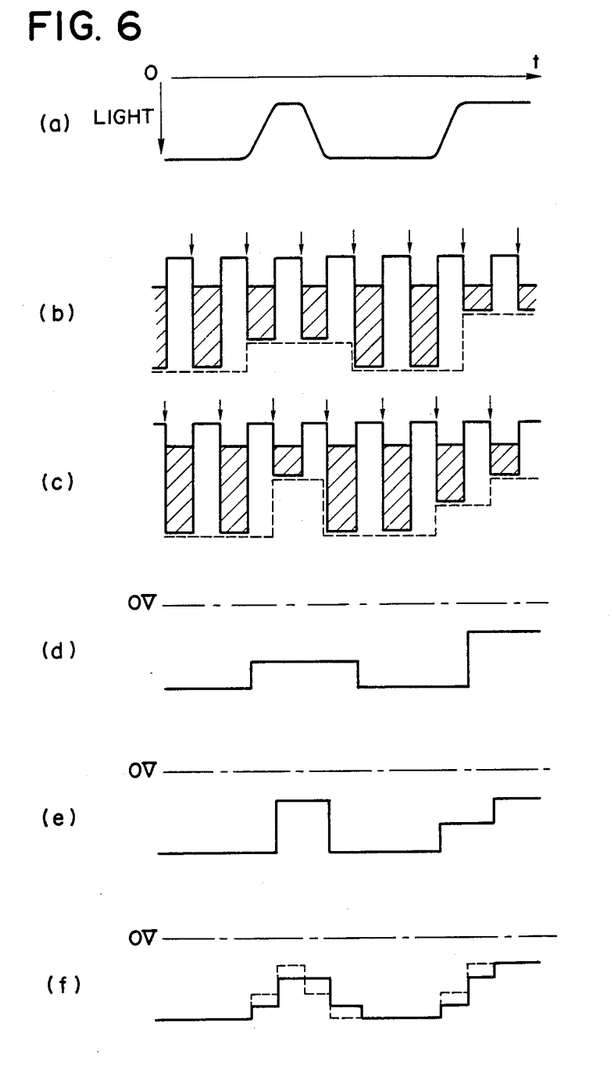

A conventional signal processor for producing such a composite signal is arranged such that the effective component of the odd-numbered pixel signal output from the CCD line sensor and the effective component of the even-numbered pixel signal are sampled and held, and the resultant signals are added and averaged to obtain the composite picture signal. The detailed operation is shown in FIGS. 6(a) to 6(f). Assume that a light intensity signal in FIG. 6(a) is input to the CCD line sensor. Effective components of the odd- and even-numbered pixel signals respectively indicated by the latched portions in FIGS. 6(b) and 6(c) are alternately output from the CCD line sensor. A sample-and-hold circuit is arranged in units of pixel signals. At timings indicated by arrows, the pixel signals are sampled and held to obtain the sampled-and-held signals indicated by FIGS. 6(d) and 6(e). These signals are added and averaged to obtain a composite pixel signal, as shown in FIG. 6(f).

In the conventional signal processor arranged such that the odd- and even-numbered pixel signal effective components alternately generated by the CCD line sensor are sampled and held, and added and averaged to obtain the composite pixel signal, the resultant signal represents an average value of the adjacent pixels, as shown in FIG. 6(f) (the correct signal is indicated by the broken line). Therefore, the signal information does not necessarily represent the accurate intensity of light incident on the CCD line sensor. In particular, the resolution is greatly degraded.

Figure 7:
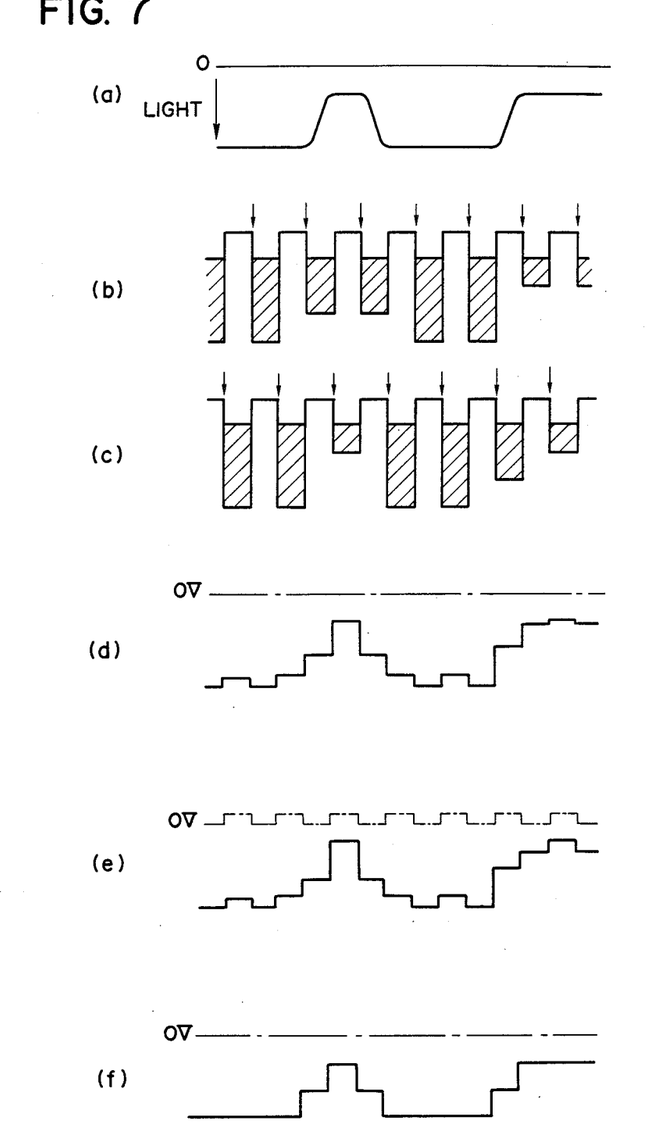

In order to obtain the composite picture signal accurately representing the signal information of the CCD line sensor, the even- and odd-numbered pixel signal effective components represented by the hatched portions in FIGS. 7(b) and 7(c) and alternately output from the CCD line sensor upon reception of light having the intensity indicated in FIG. 7(a) must be alternately sampled and held at timings indicated by the arrows by means of a single sample-and-hold circuit, thereby obtaining a composite pixel signal accurately representing the light intensity of the CCD line sensor, as shown in FIG. 7(f).

However, according to this signal processing for obtaining the composite pixel signal, the following problem may be presented.

First, the signal conversion efficiency of the odd- and even-numbered pixel signals with respect to the light intensity is not solely given because of structural variations in photoelectric transducer elements of the CCD line sensor. In other words, the detection sensitivity is not solely given. As shown in FIG. 7(d), variations in signal levels of the composite picture signal occur, so the accurate intensity of light incident on the CCD line sensor cannot be represented.

Second, for the same reason as in detection sensitivity, the DC voltage levels of the odd- and even-numbered pixel signals output from the CCD line sensors do not coincide with each other. Temporal variations (i.e., drift) of the DC levels occur. As shown in FIG. 7(e), variations in DC voltage level of the composite pixel signal cannot be avoided. As a result, it is difficult to obtain a composite pixel signal representing the accurate signal information (FIG. 6(f)) of the CCD line sensor.

Figure 8:
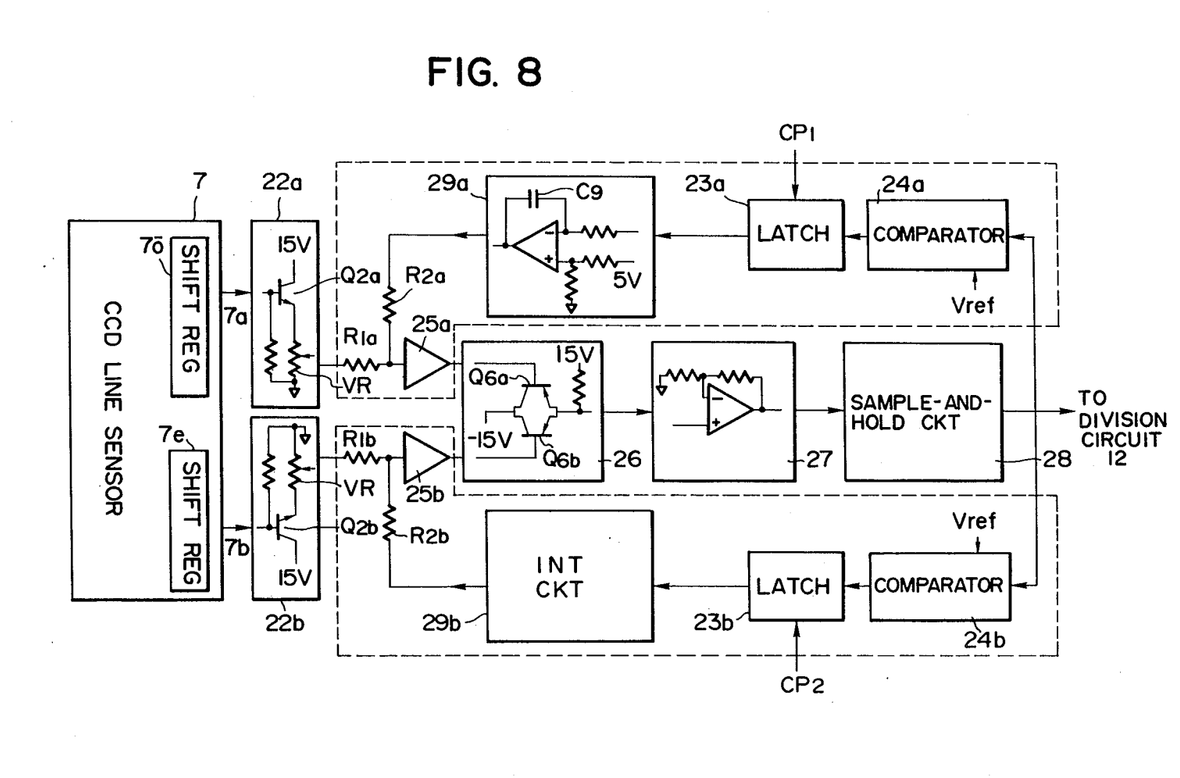
FIG. 8 is a block diagram showing one circuit according to the present invention.

A detailed arrangement of the output circuit will be described below. Referring to FIG. 8, the CCD line sensor 7 includes a plurality of photoelectric transducer elements aligned in line, an odd shift register 7o for transferring the charges from the odd-numbered pixels, and an even shift register 7e for transferring the charges from the even-numbered pixels. Odd- and even-numbered pixel outputs 7a and 7b are output from the corresponding shift registers. The even- and odd-numbered pixel outputs 7a and 7b from the CCD line sensor 7 are respectively supplied to independent sensitivity control circuits 22a and 22b. The sensitivity control circuits 22a and 22b respectively comprise emitter follower circuits including transistors Q2a and Q2b and variable resistors VR. The detection sensitivity levels of the odd- and even-numbered pixel outputs 7a and 7b are predetermined because of the structure of the CCD line sensor 7. At the initial control stage, the variable resistors VR are controlled to coincide the output 7a with the output 7b.

The outputs from the sensitivity control circuits 22a and 22b are supplied to buffers 25a and 25b through resistors R1a and R1b, respectively. DC bias voltages are applied to the input stages of the buffers 25a and 25b through resistors R2a and R2b so as to control the DC voltage levels, respectively. The DC bias voltages are controlled by a negative feedback control circuit. The negative feedback control circuit consists of comparators 24a and 24b for receiving the last composite pixel signal, latches 23a and 23b for latching the comparison outputs at timings obtained by a black reference signal (to be described later), and integrators 29a and 29b for integrating the outputs from the latches 23a and 23b to produce the DC bias voltages.

A circuit (indicated by a dotted block) for controlling the DC voltage level of the odd-numbered pixel output 7a will be exemplified. The reference voltage Vref for determining the DC voltage level of the composite pixel signal as a last output is set in the comparator 24a. When the black reference signal as the input voltage exceeds the reference voltage Vref, the comparator 24a outputs a high level (to be referred to as an H level hereinafter) output. However, if the input voltage is lower than the reference voltage Vref, the comparator 24a outputs a low level (to be referred to as an L level) output. The latch 23a latches the comparison output from the comparator 24a in response to an odd-numbered pixel clamp pulse CP1. The odd-numbered pixel clamp pulse for latching is derived from the driver 10. The driver 10 also supplies the read pulse and the transfer clock pulse to the CCD line sensor 7. Upon reception of the read pulse, the odd and even shift registers 7o and 7e receive the charges from the odd- and even-numbered photoelectric transducer elements. The transfer pulses are continuously supplied. In response to the transfer pulses, the charges, if any, are read out as the odd- and even-numbered pixel signals from both the shift registers. After readout operation of the shift registers 7o and 7e, if no read pulses are supplied, the black reference signal is read out. The black reference signal represents the signal level at the time when no light is incident on the photoelectric transducer elements. The driver 10 also supplies a sampling pulse to a sample-and-hold circuit 28 (to be described later). The sample-and-hold circuit 28 samples and holds the composite signals of odd- and even-numbered pixel signals in units of pixels. Even after the charge corresponding to the last pixel of the composite signal is read out, the sampling pulses are continuously supplied. For this reason, the black reference signal is output following the composite pixel signal formed by the charges from the even- and odd-numbered photoelectric transducer elements.

The driver 10 causes the odd shift register 7o to store N succeeding odd-numbered transfer pulses and the even shift register 7e to store N succeeding even-numbered transfer pulses. It should be noted that the number (N−1) of odd-numbered pixels is equal to that of even-numbered pixels. The even-numbered transfer pulse is delayed by half the period the odd-numbered transfer pulse. The sampling pulses are obtained such that the odd- and even-numbered transfer pulses are delayed by predetermined periods, respectively, and are gated through an OR gate. A counter is arranged in the driver 10 to generate one pulse when it counts N odd-numbered delayed transfer pulses. An output pulse from the counter is used as the clamp pulse CP1. Another counter is arranged in the driver 10 to generate a clamp pulse CP2 in the same manner as in the pulse CP1.

The comparison output (the result of comparison between the black reference signal and the reference voltage Vref) latched by the latch 23a is input to the integrator 29a whenever the odd-numbered pixel clamp pulse CP1 is obtained. An integrating capacitor C9 is charged or discharged to control the DC bias voltage of the input state of the buffer 25a. For example, if the voltage level of the black reference signal exceeds the reference voltage Vref of the comparator 24a and the latch 23a generates the H level signal, the integrator 29a outputs an integration output such that the DC bias voltage for the input stage of the buffer 25a is lowered. However, if the voltage level of the black reference signal is lowered below the reference voltage Vref and the latch 23a generates the L level output, the integrator 29a outputs an integrated output so as to increase the DC bias voltage applied to the input stage of the buffer 25a. The composite pixel signal finally output by the negative feedback control of the DC bias voltage is clamped to the DC voltage level determined by the reference voltage Vref applied to the comparator 23a.

The negative feedback control of the pixel output DC voltage level can be performed for the even-numbered pixel output 7b in the same manner as described above by means of the comparator 24b, the latch 23b, and the integrator 29b. Latching of the latch 23b is performed in response to the clamp pulse CP2.

The outputs (from the buffers 25a and 25b) whose DC voltage levels are clamped to the predetermined voltages are supplied to a mixing circuit 26 and are mixed to each other. The mixing circuit 26 comprises an emitter follower including transistors Q6a and Q6b. The mixing circuit 26 mixes the odd- and even-numbered pixel signals from the buffers 25a and 25b without impairing their effective components and generates the composite pixel signal. The composite pixel signal obtained by the mixing circuit 26 is amplified by an amplifier 27 to a predetermined signal level. The amplified signal is sampled and held by the sample-and-hold circuit in response to the sampling pulses generated by the driver 10 and is finally output as a composite pixel signal. At the same time, the composite pixel signal is fed back to the comparators 24a and 24b so as to control the DC voltage levels.

The operation of the circuit in FIG. 8 will be described hereinafter. After the sensitivity control by the variable resistors VR is completed, the DC voltage levels of the last picture signals input to the input stages of the buffers 25a and 25b are obtained such that the DC bias voltages coinciding with the reference voltage Vref set in the comparators 24a and 24b are obtained by integration operation of the integrators 29a and 29b on the basis of the outputs (comparison outputs) latched by the latches 23a and 23b in response to the odd- and even-numbered pixel clamp pulses CP1 and CP2. Even if a difference between the DC voltage levels of the pixel signals from the sensitivity control circuits 22a and 22b is present, the DC voltage level of the last composite pixel signal output from the sample-and-hold circuit 28 under the negative feedback control of the DC bias voltage is clamped to the DC voltage level determined by the reference voltage Vref. Therefore, a DC voltage level difference and level variations do not appear in the composite pixel signal.

This also applies to variations in DC voltage levels caused by temporal changes. The difference between the DC voltage levels of the odd- and even-numbered pixel outputs 7a and 7b and the variations such as drift are not influenced on the composite pixel signal.

Figure 9:
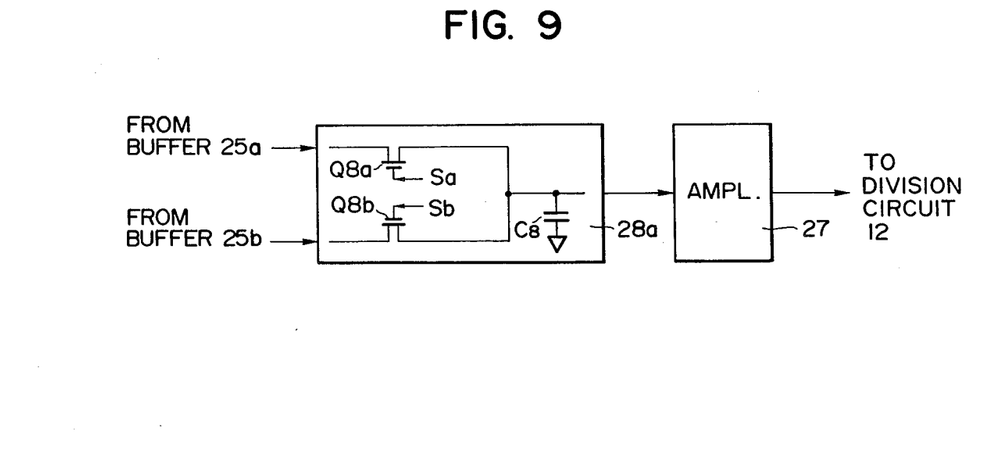
FIG. 9 is a block diagram of a circuit obtained by partially modifying the circuit of FIG. 8.

FIG. 9 is a block diagram showing another detailed arrangement of the output circuit 11.

Odd- and even-numbered pixel signals from buffers 25a and 25b are supplied to a sample-and-hold circuit 28a. An FET (Field Effect Transistor) switch Q8a switched in response to an odd-numbered pixel sampling pulse Sa and an FET switch Q8b switched in response to an even-numbered pixel sampling pulse Sb are arranged in the sample-and-hold circuit 28a. The odd- and even-numbered pixel signals from the buffers 25a and 25b are sampled by alternate ON/OFF operation of the FET switches Q8a and Q8b and are held by a capacitor C8, thereby outputting the composite pixel signal through an amplifier 27.

Other arrangements and operation of FIG. 9 are the same as those in FIG. 8, and a detailed description thereof will be omitted.

The odd- and even-numbered pixel sampling pulses Sa and Sb correspond to the odd- and even-numbered transfer pulses delayed by the predetermined periods as described above, respectively.

Since the composite pixel signal representing accurate information of the CCD line sensor can be obtained, the image information within the spatial frequency defined by the pitch of the photoelectric transducer elements of the CCD line sensors can be converted into the composite pixel signal without impairing the image information and without being modified. Therefore, the present invention is particularly effective when a highly precise picture signal input is required.

What is claimed is:

1. An apparatus for illuminating an object with illuminating means, providing a relative displacement between a linear image sensor and a pattern distribution of light from the object in a direction substantially perpendicular to an alignment direction of a plurality of photoelectric transducer elements constituting said linear image sensor, and controlling a picture signal of said image sensor according to the pattern distribution of light from the object, including:

(a) means for detecting the relative displacement and generating a displacement detection signal whenever a predetermined displacement occurs between said image sensor and the pattern distribution of light from the object;

(b) exposure detecting means having light-receiving means for receiving light from said illuminating means, said exposure detecting means being adapted to detect an exposure of said light-receiving means upon illumination of light from said illuminating means in response to the displacement detection signal and to generate an exposure detection signal representing the detected exposure; and (c) normalizing means for normalizing the picture signal in response to the exposure detection signal.

2. An apparatus according to claim 1, wherein said light-receiving means comprises means for generating a light intensity signal representing an intensity of light received thereby, said exposure detecting means comprises integrating means for integrating the light intensity signal, said integrating means being adapted to interrupt integration in response to the displacement detection signal and to restart the integration thereafter.

3. An apparatus according to claim 2, wherein said normalizing means includes means for dividing the picture signal by the exposure detection signal in response to the displacement detection signal.

4. An apparatus according to claim 3, wherein said exposure detecting means outputs as the exposure detection signal a value obtained by causing said integrating means to integrate the light intensity signal.

5. An apparatus according to claim 2, wherein said normalizing means includes means for controlling an intensity of light emitted from said illuminating means to said light-receiving means, in response to the exposure detection signal.

6. An apparatus according to claim 1, wherein said illuminating means comprises a light source and an optical member for partially transmitting light from said light source and reflecting a remaining component of the light, and said light-receiving means receives light emitted from said light source and reflected by or transmitted through said optical member.

7. An apparatus having a plurality of photoelectric transducer elements arranged in one direction, said apparatus being adapted to parallel output a first output from a plurality of odd-numbered ones of said photoelectric transducer elements and a second output from a plurality of even-numbered ones of said photoelectric transducer elements, including:

(a) generating means for combining the first and second outputs to generate a composite picture signal; and (b) control means for controlling such that DC levels of the first and second outputs input to said generating means substantially coincide with each other.

8. An apparatus according to claim 7, wherein said control means includes means for comparing the DC levels of the first and second outputs with predetermined levels and generating a comparison signal.

9. An apparatus according to claim 8, wherein said control means controls the DC levels of the first and second outputs in response to the comparison signal.

10. An apparatus comprising:
(a) linear image sensor means having a plurality of photoelectric transducer elements arranged in one direction, said linear image sensor means being adapted to parallel output a first output from a plurality of odd-numbered ones of said photoelectric transducer elements and a second output from a plurality of even-numbered ones of said photoelectric transducer elements;
(b) generating means for combining the first and second outputs to generate a composite picture signal;
(c) control means for controlling such that DC levels of the first and second outputs input to said generating means substantially coincide with each other;
(d) illuminating means for illuminating an object by light;
(e) means for providing a relative displacement between said linear image sensor means and the object in a direction substantially perpendicular to the arranged direction of said plurality of photoelectric transducer elements;
(f) means for detecting the relative displacement and generating a displacement detection signal whenever a predetermined displacement occurs between said linear image sensor means and the object;
(g) exposure detecting means having light-receiving means for receiving light from said illuminating means, said exposure detecting means being adapted to detect an exposure of said light-receiving means upon illumination of light from said illuminating means in response to the displacement detection signal and to generate an exposure detection signal representing the detected exposure; and
(h) normalizing means for normalizing said composite picture signal in response to the exposure detection signal.

* * * * *